Figure 1:
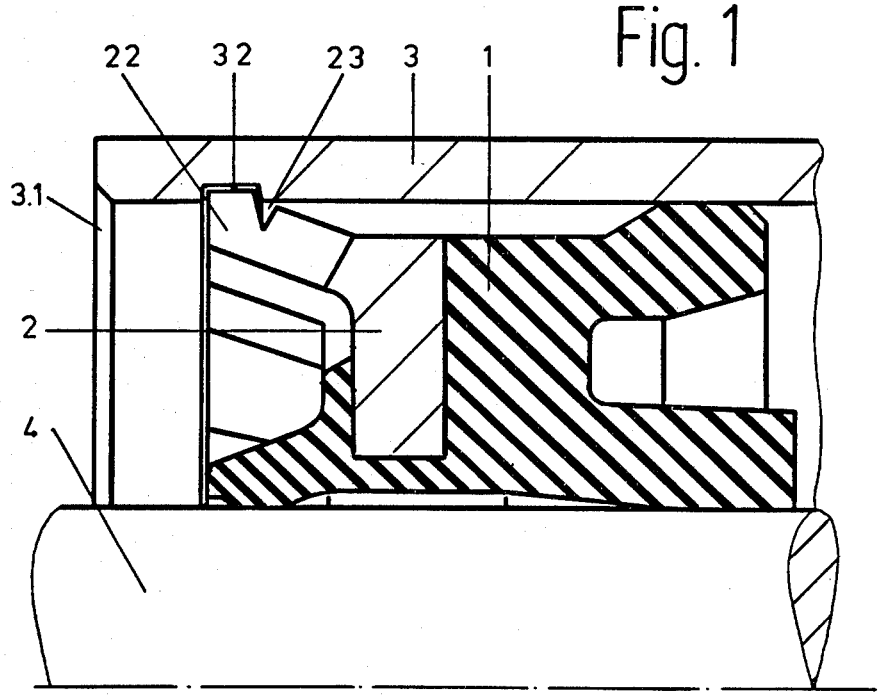

United States Patent [19]

Sick et al.

[11] 4,111,441
[45] Sep. 5, 1978

[54] SELF-ARRESTING SEALING RING

[75] Inventors: Hans-Hermann Sick, Weinheim an der Bergstrasse; Erich Habel, Fürth, both of Germany

[73] Assignee: Firma Carl Freudenberg, Weinheim an der Bergstrasse, Germany

[21] Appl. No.: 775,352

[22] Filed: Mar. 7, 1977

[30] Foreign Application Priority Data

Mar. 13, 1976 [DE] Fed. Rep. of Germany ....... 2610584

[51] Int. Cl.² ............................................. F16J 15/18
[52] U.S. Cl. .............................. 277/183; 277/206 A; 277/DIG. 10
[58] Field of Search ............ 277/181, 186, 178, 206.1, 277/183, 184, DIG. 10

[56] References Cited

U.S. PATENT DOCUMENTS

| 2,587,405 | 2/1952 | Stevens et al. | 277/181 |
| 3,306,620 | 2/1967 | Taschenberg | 277/183 |
| 3,338,584 | 8/1967 | Nakanishi et al. | 277/183 |
| 3,601,417 | 8/1971 | Szepesvary | 277/181 |
| 4,026,563 | 5/1977 | Bainard | 277/181 |

Primary Examiner—Robert I. Smith
Attorney, Agent, or Firm—Burgess, Dinklage & Sprung

[57] ABSTRACT

A sealing ring for a piston moving within a cylinder made up of an elastomeric part and a stiff support part, the ring being x-shaped in cross section, two legs of the elastomeric part, of the same radius, constituting the dynamic seal and a third leg constituting the static seal. The fourth leg is made up by the support part and projects radially beyond the third leg so as to lock into a corresponding recess is the piston or cylinder. An indentation about the circumference of the fourth leg facilitates its resilient flexing to make the initial lock. Advantageously the axial body of the seal between the legs is substantially cylindrical.

8 Claims, 2 Drawing Figures

SELF-ARRESTING SEALING RING

BACKGROUND

The invention relates to a self-arrestng sealing ring for machine parts moving relatively to one another, which consists of an elastomeric part and a support part fixedly joined thereto, especially for use in pneumatic cylinders.

In pneumatic cylinders, sealing problems can occur at two points. The one concerns the sealing of the piston, the other the sealing of the cylinder. Satisfactory solutions exist for both problems insofar as they relate to the actual dynamic and static sealing functions. It has been found disadvantageous, however, in the known sealing means, that in order to achieve proper functioning, very careful attention must be paid in all cases to the instructions for their installation. Particularly the use of close fits or of supporting means in the assembly involves special care in this regard.

THE INVENTION .

The invention is addressed to the task of developing a sealing element whose sealing action will be equal to that of the sealing elements of the prior art, which will be easy to install with generous tolerances as regards installation dimensions and without the use of secondary supporting elements, and which will be usable in special forms of construction either as a piston ring or as a cylinder seal.

This task is accomplished in accordance with the invention by a self-arresting sealing ring having an x-shaped profile, two limbs of the elastomeric part located on the same circumference being constructed as dynamically acting sealing lips, and a third limb of the elastomeric part being constructed as a statically acting sealing lip, while the fourth limb is formed from the supporting part and has a supporting edge acting axially in one or both directions, and yielding resiliently in the radial direction.

The supporting part of the sealing ring of the invention consists of metal or a very hard plastic, a thermoplastic material or a polyurethane being desirable. In one advantageous embodiment, the portion of the supporting part that bears the supporting edge is divided into segments by indentations extending over its circumference. In another embodiment, the sealing ring has a cylindrical profile between the dynamically acting sealing lips disposed on the same circumference. To adapt to the particular use of the sealing ring of the invention as a cylinder seal or as a piston seal, its dynamically acting sealing lips are disposed either on the smaller inside diameter or on the larger outside diameter.

Figure 2:
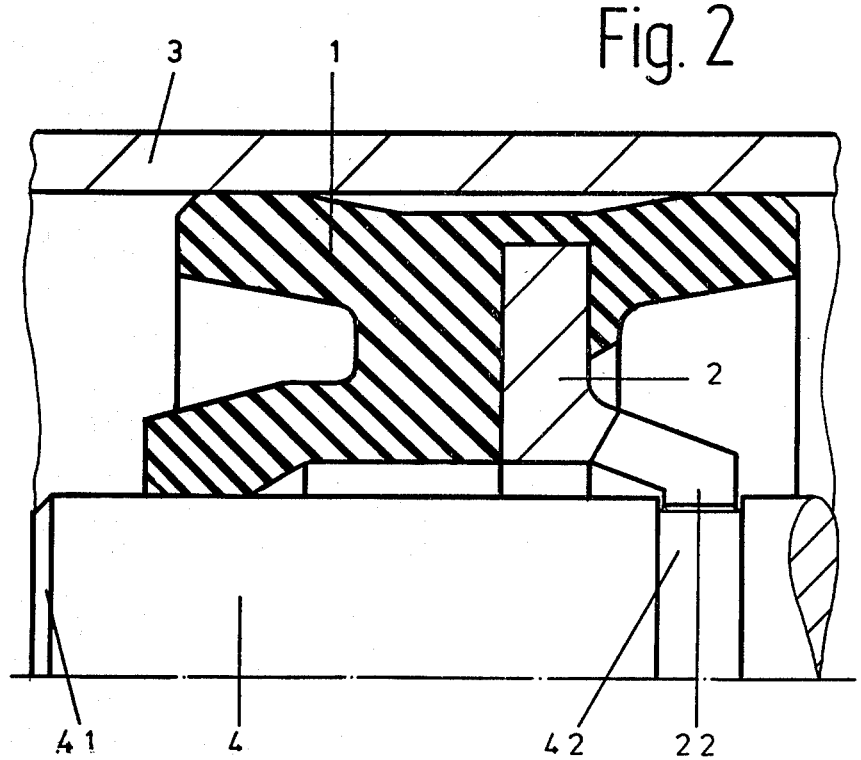

Two exemplary embodiments of the sealing ring of the invention are represented in the drawings and are further explained herewith:

FIG. 1 is an axial sectional view through a horizontal shaft within a cylinder and separated therefrom by a seal secured to the cylinder in accordance with the present invention, only the upper half being shown; and FIG. 2 is a similar view of a piston with the seal secured to the piston.

Referring now more particularly to the drawings, the seal comprises a sealing ring made up of elements 1 and 2, a cylinder 3 and a shaft 4. The sealing ring of the invention has an x-shaped profile formed of the elastomeric part 1 and the supprting part 2. The sealing lips of the elastomeric part 1, which are associated with the relatively moving machine part, are constructed in a known manner as dynamically acting sealing lips. If the two sealing lips are exposed to different media, such as air containing dust on the one side and air containing moisture on the other side, the lips can also be of different shapes.

In most applications, it is desirable to construct the elastomeric part cylindrically between the dynamically acting sealing lips. In this manner, when the sealing ring is used as a cylinder seal for example, an additional guidance is provided for the cylinder.

On the circumference of the sealing ring of the invention facing the relatively stationary machine part, there is disposed a statically acting sealing lip of the elastomeric part of a known shape, as well as the radially resilient limb of support part 2, which is provided with the holding edge 22.

The holding edge 22 has a generally rectangular profile, so that the sealng ring is held on the relatively stationary machine part in both axial directions. The use of a holding edge tapering sharply in the manner of a wedge can be desirable if non-destructive removability is to be assured. Since removal normally occurs only in the case of visible wear, i.e., after the sealing lips have been destroyed, it is, however, generally unimportant if the holding edge 22 is destroyed in removal.

Basically, the possibility exists of using a supporting part 2 of metal, in the form of a stamped metal part, for example. Supporting parts of plastics have, however, the advantage especially that it is possible to give them a shape, without particular difficulty, which is such that, in the event of a deliberate removal of the ring, the holding edge will break off in a controlled manner, as for example by providing a score 23. In a construction as a cylinder seal, such a sealing ring will, prior to its removal, be driven slightly further into the cylinder, thereby breaking off the holding edges over the entire circumference. Then the sealing ring can easily be removed from the cylinder. Assembly is accomplished in a similarly simple manner if the cylinder 3 is provided with a chamfer 31 in the case of a cylinder seal (FIG. 1) or 41 in the case of a piston seal (FIG. 2). On account of this chamfer, a uniform, resilient compression or flaring, as the case may be, of the holding edge is brought about, until it snaps into the groove 32 or 42 provided for it.

The advantages achieved with the sealing ring of the invention consist above all in the fact that it can be installed and removed very simply, while providing good sealing properties. Secondary supporting elements and close tolerances in the installation dimensions are not necessary. In addition, it is important that the use of the sealing ring of the invention permits the avoidance of assembly errors, insofar as it can not be installed in a canted position, owing to its form-locking anchorage in the stationary part.

The internal and external dimensions of the ring may vary to accomodate pistons and cylinders of different diameters but advantageously the space between the piston and cylinder will range from about 3 to 20 mm and preferably from about 5 to 7 mm. The ring can also vary in length parallel to the piston axis but advantageously is from about 4 to 30 and preferably from about 7 to 12 mm. The distance over which each of the three elastomeric legs of the x-profile contact the cylinder or piston can range from about 0.2 to 8 and preferably from about 1 to 3 mm. The channel in which the fourth leg seats can range from about 0.5 to 4 and preferably from about 7 to 2 mm parallel to the piston axis and in depth from about 0.5 to 2 and preferably from about 0.5 to 1 mm. Finally, the space between the cylindrical body of the sealing ring and the cylinder and piston may range from about 0.1 to 1 and preferably from about 0.1 to 0.5 mm with the body being closer to that surface to which the ring is not secured.

It will be appreciated that the instant specification and examples are set forth by way of illustration and not limitation, and that various modifications and changes may be made without departing from the spirit and scope of the present invention.

What is claimed is:

1. A self-arresting seal ring for machine parts moving relatively to one another, comprising an elastomeric part and a support part fixedly connected thereto, the sealing ring having an x-shaped cross-section, two limbs of of the elastomeric part lying on the same circumference and being constructed as dynamically acting sealing lips, a third limb of the elastomeric part being constructed as a statically acting sealing lip, and the fourth limb being formed from the support part and having a supporting edge projecting radially beyond the third limb and being resilient in such radial direction so as to be able to flex and lock into a suitable recess in one of the machine parts and means defining a predetermined breaking line on the support part adjacent to the supporting edge.

2. A self-arresting sealing ring according to claim 1, wherein the support part is formed of metal or of a hard and tough plastic.

3. A self-arresting sealing ring according to claim 1, wherein the means defining the predetermined breaking line comprises that portion of the support part which has the supporting edge divided into segments by indentations about its circumference.

4. A self-arresting sealing ring according to claim 1, wherein the sealing ring has a substantially cylindrical cross-section between the sealing lips.

5. A self-arresting sealing ring according to claim 4, wherein the support part is formed of metal or a hard and tough plastic, and wherein the means defining the predetermined breaking line comprises that portion of the support part which has the supporting edge divided into segments by indentations about its circumference.

6. A self-arresting sealing ring according to claim 1, having the dynamically acting sealing lips disposed on its outside.

7. A self-arresting sealing ring according to claim 1, having the dynamically acting sealing lips disposed on its inside.

8. In combination, a shaft moving within a cylinder, an a self-arresting sealing ring according to claim 1 forming a seal therebetween, one of said shaft and said cylinder being provided with a recess for receiving said fourth limb and thereby locking said ring thereto.

* * * * *